United States Patent
Keshavan et al.

(10) Patent No.: US 7,470,341 B2
(45) Date of Patent: Dec. 30, 2008

(54) METHOD OF MANUFACTURING A CUTTING ELEMENT FROM A PARTIALLY DENSIFIED SUBSTRATE

(75) Inventors: Madapusi K. Keshavan, The Woodlands, TX (US); J. Daniel Belnap, Pleasant Grove, UT (US); Dave Slutz, Bethlehem, PA (US)

(73) Assignee: Smith International, Inc., Houston, TX (US)

( * ) Notice: Subject to any disclaimer, the term of this patent is extended or adjusted under 35 U.S.C. 154(b) by 360 days.

(21) Appl. No.: 10/665,304

(22) Filed: Sep. 18, 2003

(65) Prior Publication Data

US 2004/0141865 A1 Jul. 22, 2004

Related U.S. Application Data

(60) Provisional application No. 60/411,942, filed on Sep. 18, 2002.

(51) Int. Cl.
*B32B 37/00* (2006.01)
*B32B 37/24* (2006.01)
*C04B 35/52* (2006.01)
*E21B 10/36* (2006.01)

(52) U.S. Cl. .................... 156/89.12; 175/428
(58) Field of Classification Search .......... None
See application file for complete search history.

(56) References Cited

U.S. PATENT DOCUMENTS

| | | | | |
|---|---|---|---|---|
| 4,110,084 A * | 8/1978 | Lee et al. | ...... | 51/307 |
| 4,255,165 A * | 3/1981 | Dennis et al. | ...... | 51/309 |
| 4,311,490 A * | 1/1982 | Bovenkerk et al. | ...... | 51/307 |
| 4,437,800 A * | 3/1984 | Araki et al. | ...... | 407/119 |
| 4,596,693 A | 6/1986 | Ishizuka et al. | | |
| 4,604,106 A * | 8/1986 | Hall | ...... | 51/293 |
| 4,764,434 A * | 8/1988 | Aronsson et al. | ...... | 428/565 |
| 4,797,138 A * | 1/1989 | Komanduri | ...... | 51/295 |
| 4,797,326 A * | 1/1989 | Csillag | ...... | 428/552 |
| 4,802,895 A * | 2/1989 | Burnand et al. | ...... | 51/293 |
| 4,984,642 A | 1/1991 | Renard et al. | | |
| 5,106,391 A * | 4/1992 | Lloyd | ...... | 51/293 |
| 5,264,283 A * | 11/1993 | Waldenstrom et al. | ...... | 428/408 |
| 5,435,403 A * | 7/1995 | Tibbitts | ...... | 175/432 |
| 5,472,376 A * | 12/1995 | Olmstead et al. | ...... | 451/540 |
| 5,603,070 A * | 2/1997 | Cerutti et al. | ...... | 419/6 |
| 5,773,140 A * | 6/1998 | Cerutti et al. | ...... | 428/332 |
| 5,858,539 A * | 1/1999 | Reineck et al. | ...... | 428/408 |
| 5,952,102 A * | 9/1999 | Cutler | ...... | 428/408 |
| 6,042,463 A * | 3/2000 | Johnson et al. | ...... | 451/540 |
| 6,193,001 B1 * | 2/2001 | Eyre et al. | ...... | 175/432 |
| 6,500,226 B1 * | 12/2002 | Dennis | ...... | 75/240 |
| 6,779,951 B1 * | 8/2004 | Vale et al. | ...... | 407/119 |
| 6,845,828 B2 * | 1/2005 | Boyce | ...... | 175/420.2 |

(Continued)

FOREIGN PATENT DOCUMENTS

EP 1013379 A1 6/2000

(Continued)

*Primary Examiner*—Melvin C Mayes
(74) *Attorney, Agent, or Firm*—Christie, Parker & Hale, LLP.

(57) ABSTRACT

A method of manufacturing a cutting element having a substrate and an ultra hard material layer sintered together where at least a portion of the substrate is partially densified prior to sintering, is provided.

34 Claims, 7 Drawing Sheets

U.S. PATENT DOCUMENTS

| | | | |
|---|---|---|---|
| 7,384,592 B2 * | 6/2008 | Weis et al. | 264/672 |
| 2002/0005085 A1 * | 1/2002 | Macki et al. | 75/241 |

FOREIGN PATENT DOCUMENTS

| | | | |
|---|---|---|---|
| GB | 2 091 763 | * | 8/1982 |
| GB | 2345710 A | | 7/2000 |
| JP | 53-134804 | * | 11/1978 |
| JP | 57-196773 | | 2/1982 |
| JP | 60-262905 | | 12/1985 |

* cited by examiner

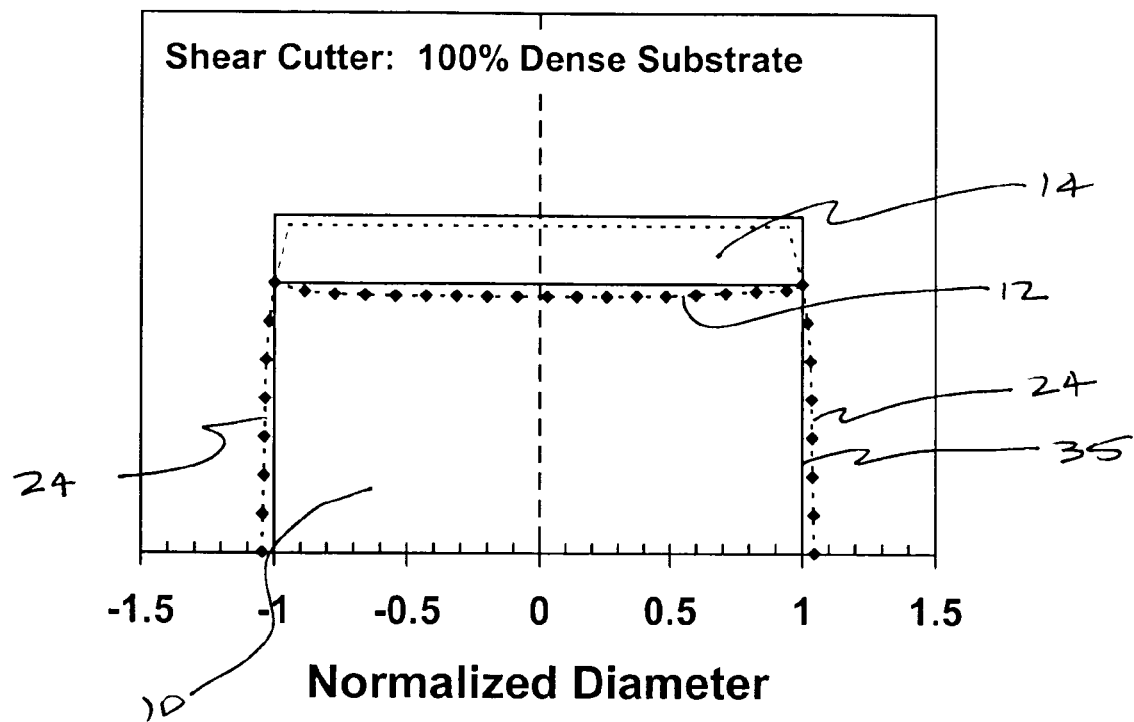

METHOD OF MANUFACTURING A CUTTING ELEMENT FROM A PARTIALLY DENSIFIED SUBSTRATE

CROSS REFERENCE TO RELATED APPLICATION

This application is based upon and claims priority on U.S. Provisional Application No. 60/411,942 filed on Sep. 18, 2002, the contents of which are fully incorporated herein by reference.

FIELD OF THE INVENTION

The present invention is generally related to a method for forming cutting elements using substrate materials which are not fully dense, and which are sintered to full density during high pressure/high temperature processing.

BACKGROUND OF THE INVENTION

Cutting elements, such as shear cutters for rock bits, for example, typically have a substrate to which is bonded an ultra hard material layer forming a cutting layer (also referred to as a cutting table). The substrate is generally made from a fully dense cemented tungsten carbide-cobalt (WC—Co) material (sometimes referred to simply as "carbide"), while the cutting layer is made from a polycrystalline ultra-hard material, such as polycrystalline diamond ("PCD") or polycrystalline cubic boron nitride ("PCBN"). Ultra-hard material particles and a binder are positioned over the substrate in a mold commonly referred to as a can and are subjected to high-pressure/high temperature conditions ("HPHT"). The HPHT process simultaneously accomplishes two critical functions: a) the ultra-hard material particles are sintered forming a polycrystalline ultra hard material layer, and b) the ultra-hard material layer and the substrate are metallurgically joined along a common interface.

Common problems that plague cutting elements and specifically cutting elements having an ultra-hard cutting layer, such as PCD or a PCBN, layer bonded on a solid carbide substrate, are chipping, spalling, partial fracturing, cracking or exfoliation of the cutting table. These problems result in the early failure of the cutting layer and thus, in a shorter operating life for the cutting element. Typically, these problems may be the result of residual stresses generated on the ultra-hard material layer. Residual stresses are thought to be generated by the coefficient of thermal expansion (CTE) mismatch between the substrate and the ultra hard material layer.

To address the residual stress problem, a number of engineering fixes have been attempted by making the interface between the substrate and the ultra hard material layer discrete. For example, to reduce the residual stresses formed on the interface between the substrate and the cutting layer and to enhance the delamination resistance of the cutting layer, irregularities are sometimes formed or machined onto the interface of the substrate which interfaces with the ultra hard material layer, forming a non-uniform interface between the substrate and the ultra hard material layer. Moreover, transition layers may be incorporated in some cutting elements between the substrate and the ultra hard material layer. The transition layers typically have properties, including a CTE, which are intermediate between the properties of the substrate and the cutting layer, thus, reducing the residual stresses generated by the CTE between the substrate and the ultra hard material layer.

SUMMARY OF THE INVENTION

The present invention is directed to a method of manufacturing a cutting element in which the substrate of the cutting element is formed using a substrate material at least part of which is not fully densified, and where both the substrate powder and the powder for the cutting table are densified simultaneously.

In one exemplary embodiment, the method includes selecting an ultra hard material which is not fully densified, selecting a substrate at least a portion of which has a density that is less than 100% of full density of the portion. The method further includes placing the ultra hard material over the substrate material, and processing the resulting assembly of substrate and ultra-hard materials at a sufficient temperature and pressure for full densification and metallurgical joining of the substrate and ultra-hard material, where the density is selected for controlling the magnitude of the residual stresses generated on the ultra hard material layer during sintering. In one exemplary embodiment the density of is in the range of about 40% to about 99% of full density. In another exemplary embodiment, the partially densified portion has a porosity in the range of about 1% to about 30%. In a further exemplary embodiment a portion of the substrate has a density of less than 100% of full density and a portion of the substrate is fully densified prior to processing. In another exemplary embodiment, the entire substrate is partially densified.

In a further exemplary embodiment a method is provided for controlling sintering induced stresses generated on an ultra hard material layer of a cutting element. The method includes selecting an ultra hard material which is not fully densified, selecting a substrate at least a portion of which has a density less than 100% of full density of the portion for controlling the magnitude of the sintering-induced stresses generated, and sintering the ultra hard material and the substrate to form the cutting element. In one exemplary embodiment, the substrate constraints shrinkage of the ultra hard material layer during sintering, and the amount of constraint provided by the substrate is a function of density of the substrate prior to sintering. In another exemplary embodiment the density of the at least a portion of the substrate is in the range of about 40% to about 99% of full density of said portion. In yet another exemplary embodiment, the partially densified portion has a porosity in the range of about 1% to about 30%. In a further exemplary embodiment a first portion of the substrate has a density less than 100% of full density of the first portion and a second portion is fully densified. In another exemplary embodiment, the entire substrate is partially densified.

In yet a further exemplary embodiment, a method is provided for controlling sintering induced stresses generated on the an ultra hard material layer of a cutting element. The method includes selecting an ultra hard material which is not fully densified, controlling the constraint by selecting a substrate at least a portion of which has a density less than 100% of full density of the portion, and sintering the ultra hard material and the substrate to form the cutting element.

In another exemplary embodiment, a method is provided including selecting an ultra hard material which is not fully densified, selecting a substrate having a first portion that has a first density less than 100% of full density of the portion, and a second portion that has a second density that is different from the first density, placing the ultra hard material over the substrate material, and processing the resulting assembly of substrate and ultra-hard materials at a sufficient temperature and pressure for full densification and metallurgical joining of the substrate and ultra-hard material.

BRIEF DESCRIPTION OF THE DRAWINGS

These and other features and advantages of the present invention will be better understood by reference to the following detailed description when considered in conjunction with the accompanying drawings wherein:

FIGS. 4a, 4b and 4c are graphical representations of the effect of substrate density on sintering induced distortion.

DETAILED DESCRIPTION OF THE INVENTION

Figure 1:
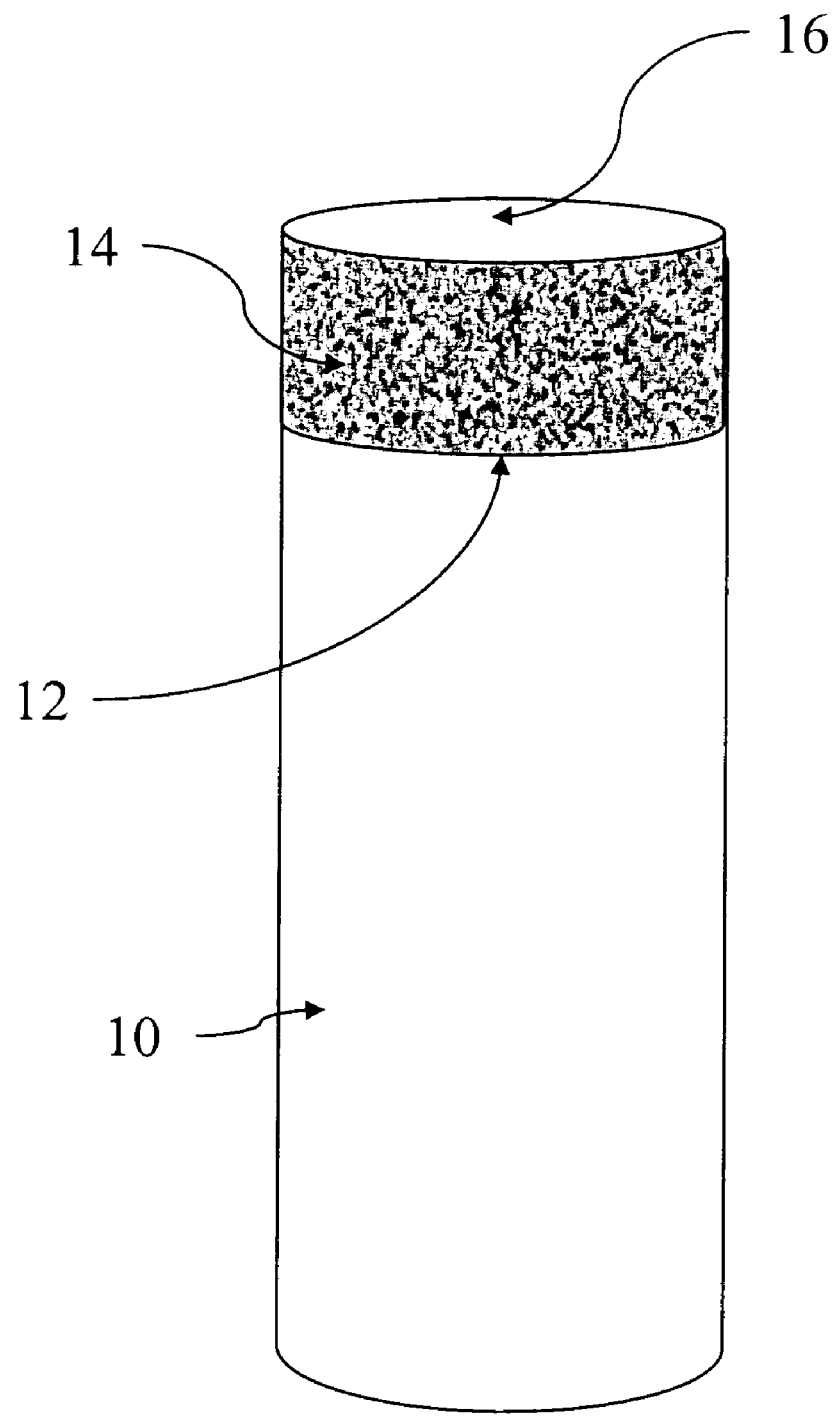
FIG. 1 is a perspective view of a shear cutter type of cutting element.

This invention relates to a method of manufacturing cutting elements by co-densifying a substrate material and an ultra-hard material which are not fully dense. Cutting elements employed in rock bits have a variety of conventional shapes. For descriptive purposes, the present invention is described in relation to a cylindrical cutting element. A cylindrical cutting element, such as a shear cutter as shown in FIG. 1, has a cylindrical tungsten carbide body 10 which has an interface 12. An ultra-hard material layer 14 is bonded over the interface 12 and forms the cutting layer or table 16 of the cutting element. Exemplary materials forming the ultra-hard material layer include polycrystalline diamond (PCD) layer or a polycrystalline cubic boron nitride (PCBN) layer.

Applicants have discovered that residual stresses that develop in HPHT sintered materials have two components. The first component consist of thermal stresses caused by the difference in the CTE between the substrate material and the ultra-hard material. These thermal stresses develop during the cooling after the HPHT process. These stresses can be reasonably well-predicted by the use of analytical methods such as finite element analysis (FEA). The second component consists of stresses that develop during the ultra-hard material sintering process (i.e. at the full temperature and pressure of the HPHT process where consolidation of the ultra hard material occurs) and as such can be referred to as sintering-induced stresses. Sintering-induced stresses are defined as variations in the ultra hard material residual stresses which are independent of the thermal stresses. The sintering-induced stresses are generally less well understood than thermal stresses since no analytical model currently exists to predict this type of stress generation and/or to measure such type of stresses. Applicants, however, have been able to measure such sintering induced stresses by using Raman spectroscopy. Raman spectroscopy employs a laser source which is used to probe the intrinsic crystallographic vibrations in the ultra hard material crystals, e.g., diamond crystals, on the outer surface of the ultra hard material layer. The room-temperature vibrational frequency of an ultra hard material crystal is uniquely determined by the three-dimensional state of strain in the crystal. This is in turn related to the hydrostatic stress state in the crystals. Consequently, the higher the frequency of the ultra hard material crystals, the higher the stresses.

Sintering-induced stresses on the outer surface of the ultra hard material are proportional to the stresses on the interface between the ultra hard material and the substrate. Thus, by measuring the sintering-induced stresses on the outer surface of the ultra hard material layer using Raman spectroscopy, the sintering induced stresses on the interface surface between the ultra hard material layer and the substrate can be ascertained. Using Raman spectroscopy, sintering-induced stresses in PCD cutting elements have been measured to be larger than 2000 MPa (290 ksi) at the PCD layer outer surface.

Sintering stresses are related to the permanent deformations which occur during the consolidation portion of the HPHT process. Applicants have discovered that there is an inverse relationship between sintering-induced stresses and shrinkage of the ultra hard material layer during sintering. An example or this relationship between HPHT shrinkage is given in Table 1. The data in Table 1 was obtained from two cutting elements having identical tungsten carbide substrates. One cutting element had a PCD layer designated as PCD A comprising 2% by weight Cobalt and an average diamond grain size of about 45 microns. The other cutting element had a PCD layer designated as PCD B comprising 2% Cobalt and an average diamond grain size of about 24 microns.

TABLE 1

| Shrinkage and Compressive Stress Data. | | |
|---|---|---|
| Material | HPHT Shrinkage | Compressive Stress |
| PCD A | 16% | 2.35 GPa |
| PCD B | 11% | 2.71 GPa |

The compressive stresses depicted in Table 1 were measured at the upper surface of the PCD using Raman spectroscopy. Similar or greater stress reductions are expected at the interface between the PCD and the substrate. Axial shrinkage is depicted in Table 1. Radial reduction in shrinkage is expected to be of the same or similar magnitude. It can be seen from the data depicted in Table 1 that an inverse relationship exists between compressive stresses (and thus, residual stresses) and shrinkage for PCD materials. In other words, the greater the shrinkage of the PCD, the lower the compressive stresses. Consequently, applicants have discovered that the residual stresses on an ultra hard material of a cutting element may be reduced by reducing the shrinkage constraints on the ultra hard material layer, thus allowing the ultra hard material to shrink a greater amount.

Moreover, sintering-induced stresses further develop at least in part because the interface between the ultra-hard material layer and the substrate imposes a physical constraint on the densification of the ultra-hard layer, i.e., during the HPHT process, the ultra hard material layer bonds to the substrate while the ultra hard material layer continues to consolidate and thus, shrink. Because of this interfacial physical constraint, densification in the ultra-hard layer cannot occur independent of substrate deformation. Therefore, the HPHT densification process leads to deformations (and by association strains and stresses) in the sintered ultra hard material layer.

Part of the driving force for sintering-induced stresses is the volumetric shrinkage difference between the substrate and the ultra-hard material, which is compounded by disproportionate substrate and ultra-hard material volumes. A PCD layer shrinks more than the tungsten carbide substrate during sintering. The present invention provides for a method of making cutting elements with reduced sintering-induced stresses by not fully densifying the substrate, or by using a substrate that is not fully densified, prior to sintering. Applicants have discovered that a substrate that is not fully densified prior to sintering provides a lesser constraint to diamond shrinkage during sintering than a fully densified substrate, thus allowing the ultra hard material layer to shrink more and preventing the further generation of residual stresses due to the constraint.

Figure 2:
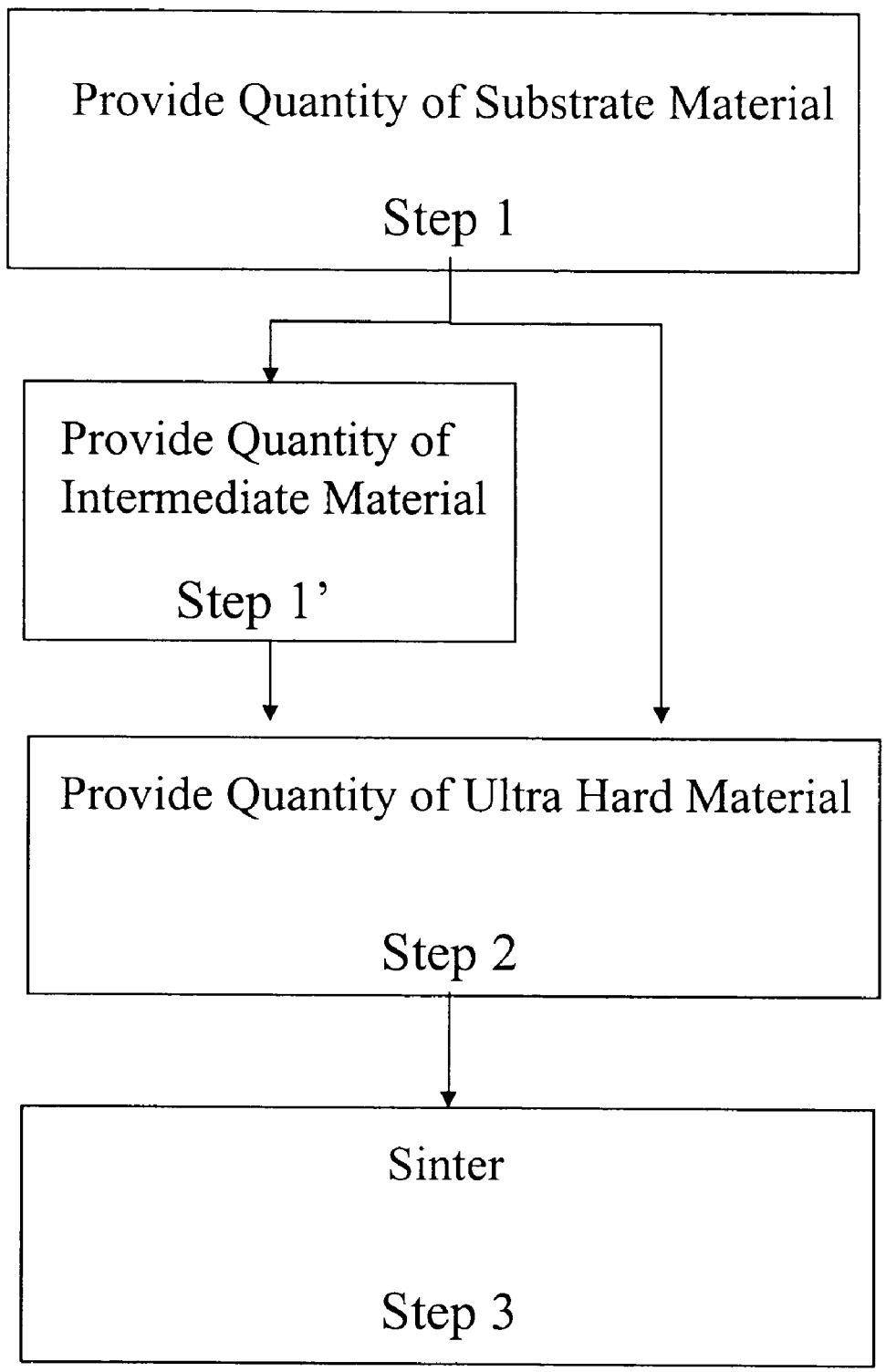
FIG. 2 is a flow-chart showing exemplary process steps for a method of manufacturing a cutting element according to an exemplary embodiment of the present invention.

FIG. 2 is a flow-chart of an exemplary method of manufacturing the cutting element shown in FIG. 1 according to the present invention. In a first step, a quantity of partially densified substrate material, such as a powder in an exemplary embodiment having a density of about 40% to 70% of full density, with compaction, a pre-cemented powder, in an exemplary embodiment having a density of about 50% to 70% of full density, with compaction, or a solid material containing a quantifiable amount of porosity, as for example 1% to 50%, and more preferably 1% to 30%, porosity, such as, for example cemented carbide, tungsten or a mixture of tungsten carbide commingled with Cobalt and subjected to thermal conditions insufficient to produce full density is provided and placed formed into a mold, also known as a can, having the desired dimensions of the cutting element. The phrases "full density," and "100% density" as used herein in relation to part, as for example a substrate, mean that the part is fully dense having "0" or no porosity. Similarly the phrases "full densification" and "100% densification" as used in relation to a part mean densifying the part or that the part is densified to have "0" or no porosity.

In a second step as shown in FIG. 2, a quantity of ultra-hard material, such as a powder, a pre-cemented powder, a higher shear compaction material or a porous solid, such as, for example, diamond or cubic boron nitride commingled with a binder such as polypropylene carbonate, paraffin, polyethylene, etc. is added on top of the substrate material.

Alternatively, as shown in optional step 1', one or more layers of a transition material may be added between the substrate material and the cutting material. Such a transitional material preferably has properties intermediate to the properties of the substrate and cutting materials, such as a CTE intermediate between the substrate material and the cutting material. For example, the transitional material may include tungsten carbide, diamond, and cubic boron nitride particles of varying sizes and any combination thereof. Alternatively, the transitional material may be an ultra-hard material itself or a substrate material.

To achieve the desired substrate density, a variety of powder compaction/densification techniques may be used including heating to times and temperatures insufficient to produce full density.

Figure 3A:
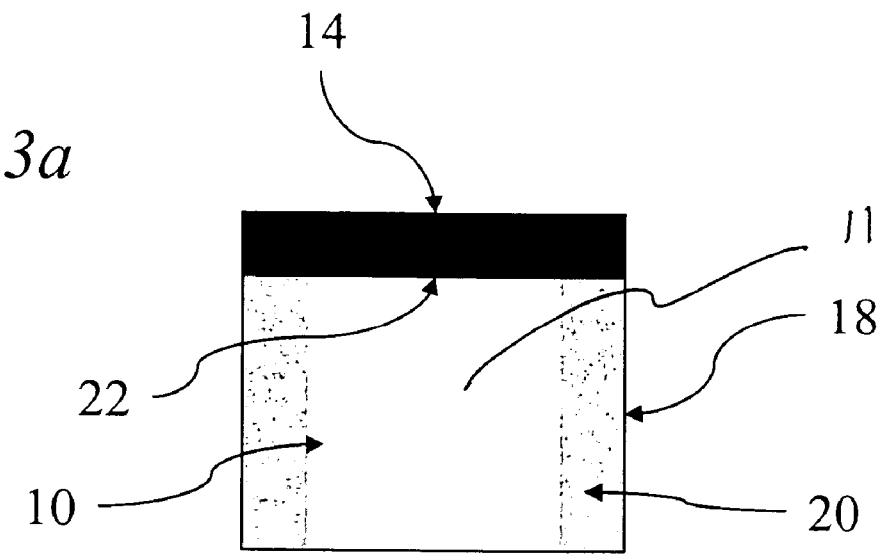
FIGS. 3a, 3b and 3c are schematic diagrams of exemplary embodiments of cutting elements according to the current invention having various arrangements of fully densified, partially densified and porous materials.
Figure 3B:
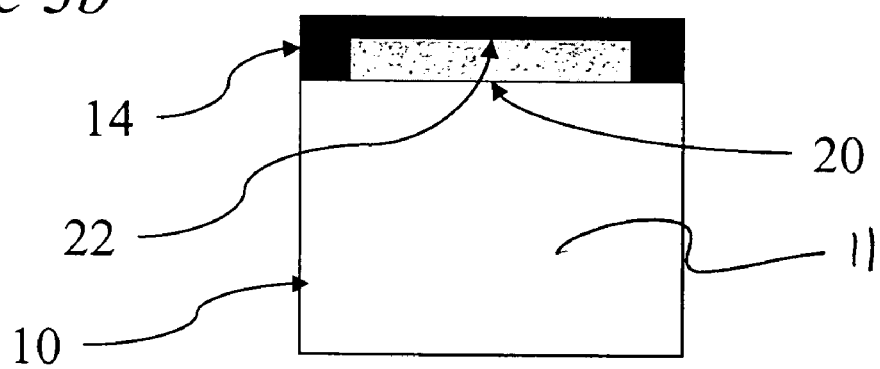
Figure 3C:
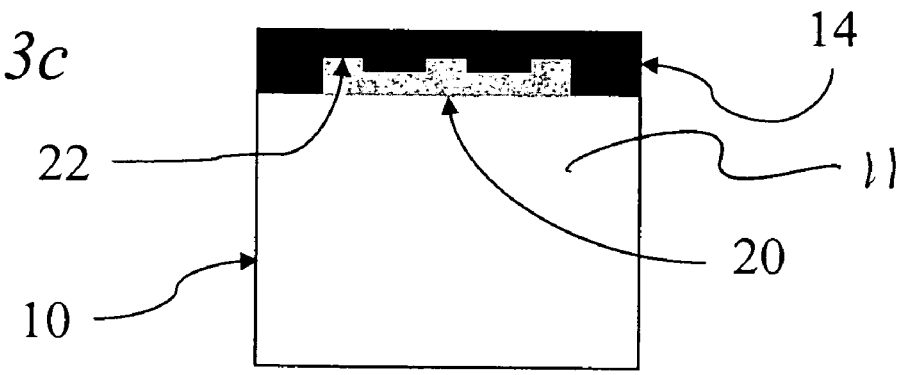

In addition, although only partially densified substrates are discussed above, a combination of fully and partially densified substrates, such as a solid/powder substrate may be utilized where appropriate. In such an exemplary embodiment, as shown in FIGS. 3a to 3c, any combination of fully densified, partially densified and porous substrate materials can be used in forming the cutting elements of the present invention, allowing for the control, and thus, tailoring of the sintering induced stresses on the ultra hard material layer and on the interface between the ultra hard material layer and the substrate. For example, in FIG. 3a a two component substrate 10 is utilized wherein the outer portion 18 of the substrate is not fully densified forming a not-fully densified region 20 surrounding a more fully or a fully densified region 11. Alternatively, as shown in FIGS. 3b and 3c, the two component substrate 10 might be fully densified except for an interfacial portion 22 of the substrate in direct contact with the ultra-hard layer 14 of the cutting element, and which in the exemplary embodiment shown in FIG. 3b is surrounded by the ultra hard material. In this regard a non-fully densified region 20 extends over the fully densified region 11 and the ultra hard material layer encapsulates the non-fully densified region extending to the fully densified region 11, as for example shown in FIG. 3b. In an alternate exemplary embodiment, the non-fully densified region 20 may take on any suitable configuration, such as rectangular or stepped, such that a suitable interface, uniform or non-uniform, 22 between the substrate 10 and ultra-hard layer 14 is formed, as for example shown in FIG. 3c. The ultra hard material layer may be in contact with both the fully densified region and the partially densified region as for example shown in FIGS. 3a to 3c.

Although three exemplary embodiments of combination substrates are shown in FIGS. 3a to 3c, it should be understood that any suitable combination of single or multiple non-fully, partially densified and fully densified material regions may be used in the substrate such that a cutting element having suitable residual stress characteristics is formed. For example, a substrate having a non-fully densified region surrounding a fully densified region and having a further non-fully densified region interfacing with the ultra hard material layer may be used. Moreover, all the regions may be not fully densified, where the degree of densification of one region is different from the degree of densification of the other region. For example, in FIG. 3a both regions 11 and 20 may be non-fully densified, with region 11 being more fully densified than region 20.

In a third step, as shown in FIG. 2, the combined materials are sintered in a high pressure, high temperature press (the HPHT process), forming a cutting element with a cemented tungsten-carbide substrate and a polycrystalline ultra-hard material cutting layer. The sintering process causes the substrate powder material and the ultra hard powder material to fully solidify, consolidate and bond completely to each other. In essence, the substrate becomes integral with the cutting layer creating a single cutting element piece.

Figure 4A:
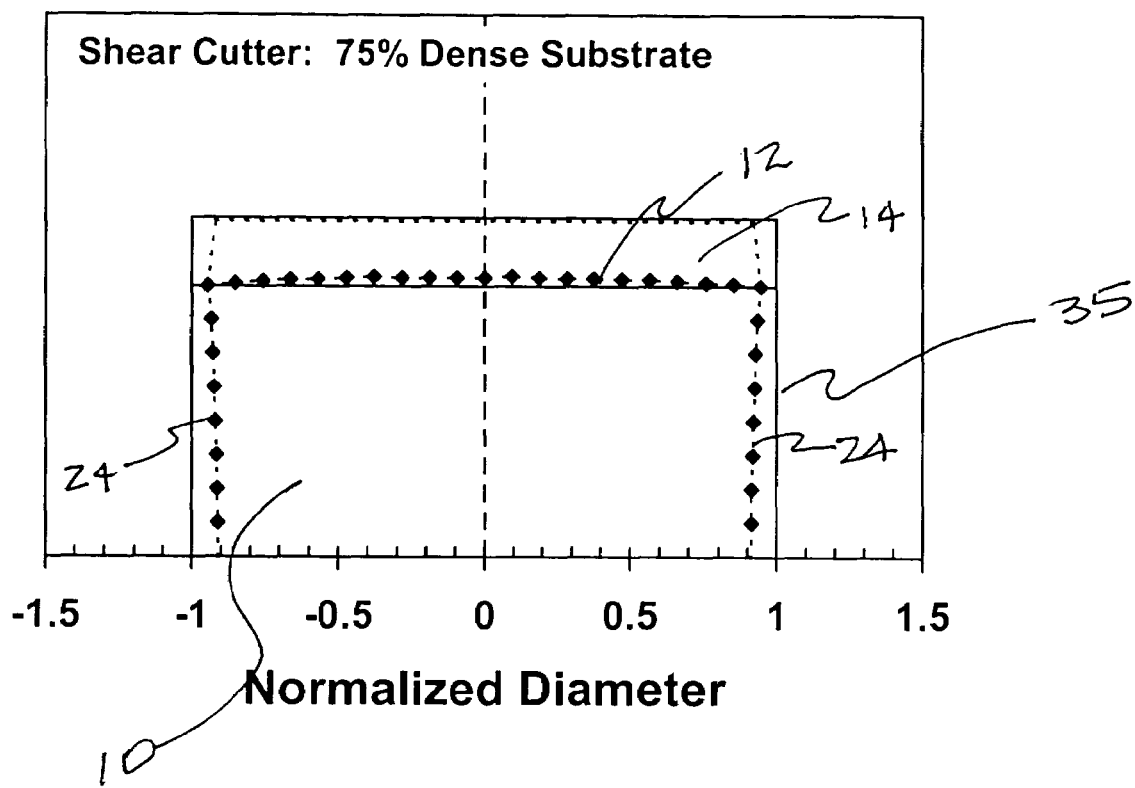
Figure 4C:
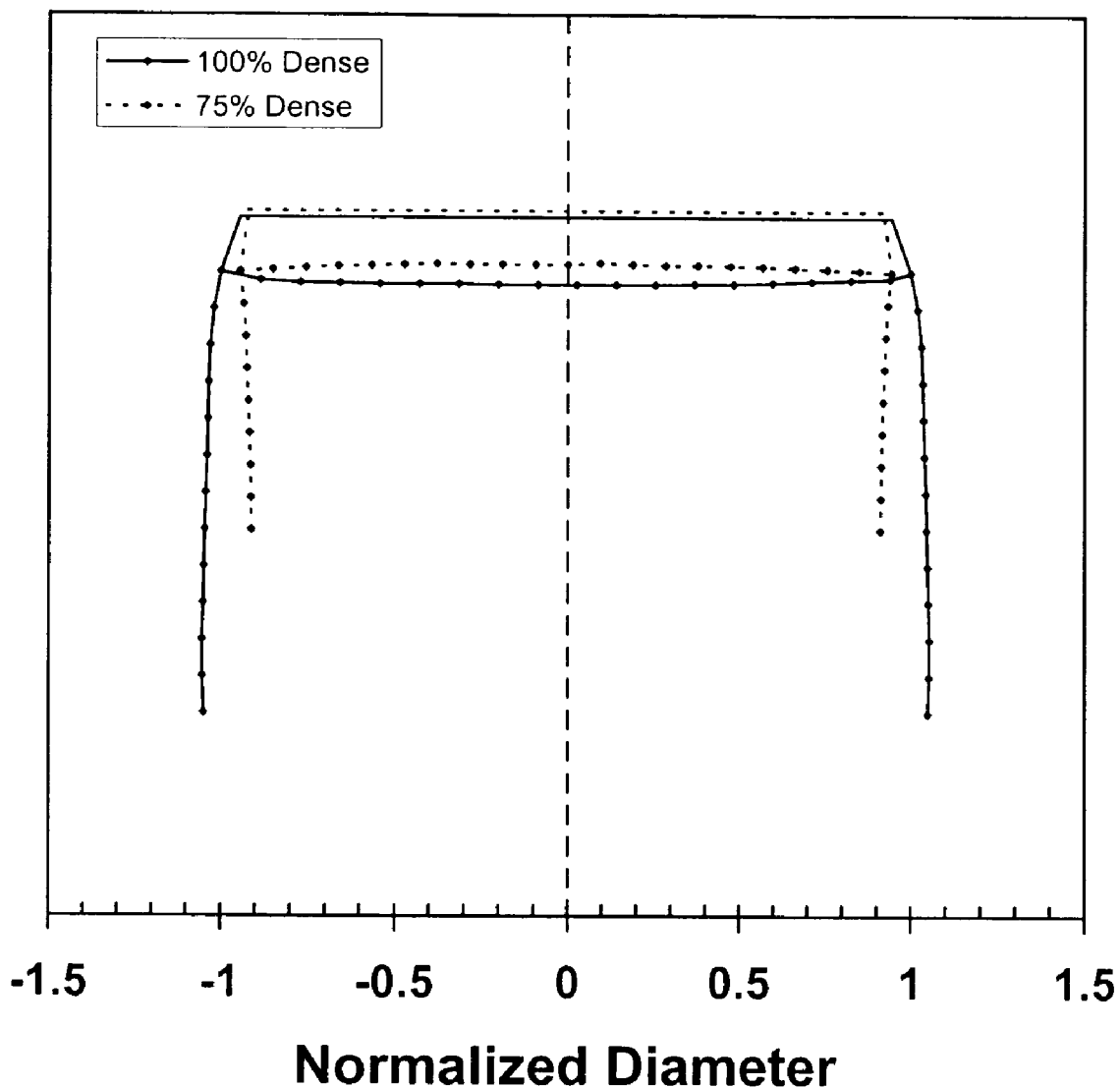

In an exemplary embodiment of the present invention, the physical constraints placed on the ultra hard material layer by the substrate due shrinkage during the HPHT process are reduced by controlling the relative shrinkage of the substrate and ultra hard material layer. In an exemplary embodiment this is achieved by controlling the density of the substrate prior to the HPHT process. As shown in FIGS. 4a and 4b, altering the density of the substrate material influences the distortion of the interface between the substrate and ultra-hard layer during sintering. FIGS. 4a and 4b are based on test data of an exemplary embodiment cutting element formed according to principles of the present invention and a conventional cutting element, respectively. FIGS. 4a, and 4b, each show solid in a solid line 35 an undistorted cutting element substrate and ultra hard material layer prior to sintering, and data points and dashed lines showing how the dimensions of the cutting element substrate are changed during sintering. For example, with a substrate having a sintered density of about 100% prior to sintering (FIG. 4b), the interface 12 between the substrate and ultra-hard layer bows downward, while the sides 24 of the substrate 10 expand outward relative to the cutting table. In contrast, with an exemplary embodiment substrate having a density of approximately 75% prior to sintering (FIG. 4a) the distortions are reversed (and measurably smaller), with the interface 12 bowing upward and the substrate sides 24 measuring smaller than the ultra-hard layer 14. FIG. 4c provides a comparison of the two curves shown in FIGS. 4a and 4b. It is apparent from these figures that the sintered density of the substrate may be used to minimize or engineer the type of distortion created during the HPHT process.

In one exemplary embodiment of the invention the pre-sintering density of at least a portion of the substrate is selected to be between about 50% and 100% of the fully densified substrate density to minimize the distortion of the cutting element resulting from thermal mismatch between the substrate and ultra-hard material during sintering. Preferably, the density of such substrate portion is selected to be between about 70% and 100%, and more preferably between about 90 and 100%. In exemplary embodiments, a substrate have at least a porous not fully densified portion is used to form the cutting element. With this exemplary embodiment, the not fully densified portion of the substrate has a density in the range of about 50% to about 99% of the fully densified density of the substrate. In another exemplary embodiment, a not fully densified portion of the substrate has a density in the range of about 70% to about 99% of the fully densified density of the substrate. In yet another exemplary embodiment, a not fully densified portion of the substrate has a density in the range of about 90% to about 99% of the fully densified density of the substrate. In a further exemplary embodiment, the not fully densified portion has a density in the range of about 70% to about 90% of the fully densified density of the substrate. The density of a substrate can be measured using various well known methods including but not limited to the Archimedes method.

The thicker, or rather, the more voluminous the ultra-hard material layer, the more impact strength and wear resistance it will have and the more energy it will be able to absorb and the greater chip resistance that it will have. However, as the volume of the ultra-hard material layer increases, the residual stresses formed on the interface between the ultra hard material layer and the substrate increase, increasing the risk that the ultra-hard material layer will delaminate from the substrate increases. It is believed that the exemplary embodiment method will allow for the manufacturing of a cutting element having reduced residual stresses at the interface of the ultra hard material layer and the substrate and thus allowing for the incorporation of a thicker ultra hard material layer providing for greater impact strength.

Applicants have discovered that the shrinkage of the ultra hard material can also be effected by the interface geometry and the HPHT conditions. Applicants believe that the shrinkage may also vary with the composition of the substrate and the ultra hard material.

Figure 5:
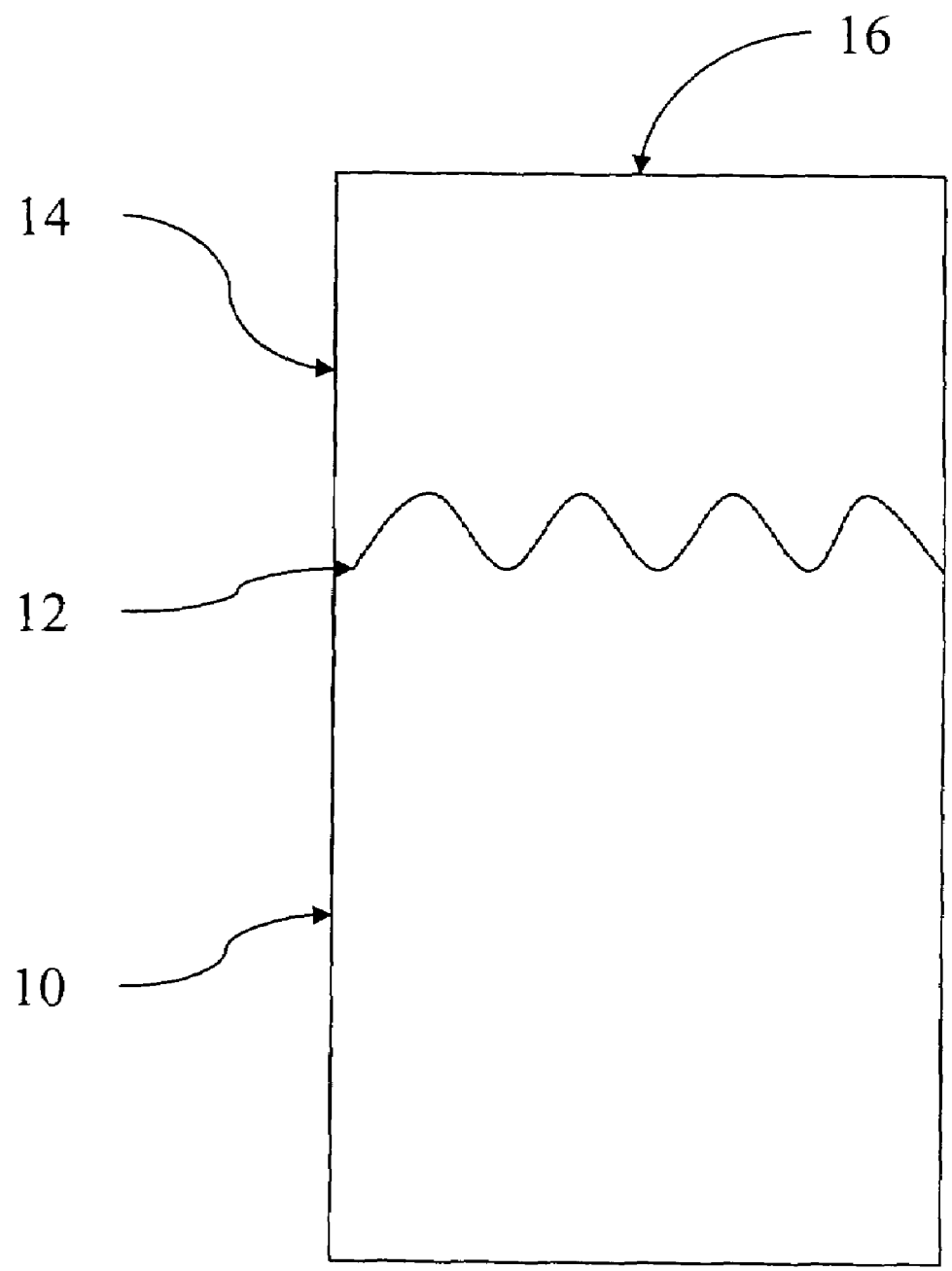
FIG. 5 is a schematic diagram of an exemplary embodiment cutting element having a non-uniform interface between substrate and ultra-hard material layer.

Returning to the structure of the cutting element, the substrate interface 12 interfacing with ultra hard material layer may be non-uniform, as for example it may be patterned with raised designs to form various cross-sectional geometries, as shown schematically in FIG. 5. Furthermore, the patterned non-uniform interface may have a continuous curvature, or may comprise multiple ridges and grooves or other irregularities. These ridges or grooves may be annular or linear or even wiggly. Moreover, an embossed transition material sheet may be cut to form a transition layer that is smaller than the ultra-hard material layer or may form a transition layer which tapers to an edge at the cutting element periphery so as to allow for maximum ultra-hard material layer thickness at the circumference of the cutting element. An increase in the ultra-hard layer thickness at the circumference of a shear cutter is desirable especially in shear cutter type cutting elements since shear cutter type of cutting elements are typically mounted on a bit body at a rake angle and contact the earth formation along their circumferential edge.

With any of the above referenced exemplary embodiments, multiple layers of ultra-hard material powder may be employed, each forming a separate ultra-hard material layer. The ultra-hard material layers may contain different grades of ultra-hard material and/or may even be of different types of ultra-hard material, as for example, diamond and cubic boron nitride. Different particle sizes of the same ultra-hard material may be applied in separate layers. For example, the cutting element may be formed using two ultra-hard material layers one on top of the other, wherein each sheet contains a different grade of ultra-hard material. With any of the above described embodiments, any crack growth that travels chordwise along the cutting layer is arrested once it grows horizontally through and across the layer in which it is initially formed and reaches a different grade or a different type of layer.

With all of the above described exemplary embodiments, a coating may be applied over the ultra-hard material layer to improve the thermal stability and to change the residual stresses in the ultra-hard material layer, and to protect the cobalt in the ultra-hard material layer from the corrosive environment during drilling. In one embodiment, a tungsten coating in foil form is placed over the ultra-hard material sheet layer prior to sintering. Once the cutting element is sintered, the tungsten foil forms into a tungsten carbide coating.

In other exemplary embodiments, instead of a tungsten coating, a tape of niobium or a wafer of silicon is placed over the ultra-hard material. If niobium is used, then a coating of niobium carbide is formed over the ultra-hard material layer after the sintering process is completed. If silicon is used, a coating of silicon carbide is formed after sintering. Alternatively, a powder of aluminum oxide may be placed over the ultra-hard material layer to form a coating of aluminum oxide. The thickness of these coatings are preferably between 5 and 10 microns.

Although specific exemplary embodiments are disclosed herein, it is expected that persons skilled in the art can and will design alternative cutting elements and methods to produce the cutting elements that are within the scope of the following claims either literally or under the Doctrine of Equivalents.

What is claimed is:

1. A method of manufacturing a cutting element comprising:
    selecting an ultra hard material having a volume and which is not fully densified;
    selecting a substrate having a volume, wherein at least a portion of said substrate has a density that is less than 100% of full density of said at least a portion;
    placing the ultra hard material over the substrate; and
    sintering the resulting assembly of substrate and ultra-hard material at a sufficient temperature and pressure for full densification and metallurgical joining of the substrate and ultra hard material, wherein the ultra hard material shrinks during sintering, and wherein selecting a substrate further comprises selecting the density in response to the volumes of said substrate and said ultra hard material for providing a desired level of constraint by the substrate to the ultra hard material shrinkage during sintering.

2. A method as recited in claim 1 wherein selecting a substrate comprises selecting a substrate having a first portion having said density less than 100% of full density and a second portion that is fully densified prior to sintering.

3. A method as recited in claim 2 wherein said substrate first portion extends over the second portion and wherein the ultra hard material layer is placed over the first portion.

4. A method as recited in claim 1 wherein selecting a substrate comprises selecting a substrate comprising an outer portion surrounding an inner portion, wherein the outer portion of the substrate has said density less than 100% of full density and the inner portion of the substrate is fully densified.

5. A method as recited in claim 1 wherein selecting a substrate comprises selecting a substrate wherein a first portion of the substrate has a first density and wherein a second portion of the substrate has a second density, wherein the first density is different from the second density.

6. A method as recited in claim 1 wherein selecting a substrate comprises selecting a substrate wherein the entire substrate has a density less than 100% of full density of the substrate.

7. A method as recited in claim 1 wherein selecting a substrate comprises selecting a substrate wherein said at least a portion has a density in the range of about 70% to about 90% of full density of said portion.

8. A method as recited in claim 1 wherein selecting a substrate comprises selecting a substrate wherein said at least a portion has a density in the range of about 40% to about 99% of full density of said portion.

9. A method as recited in claim 8 wherein selecting a substrate comprises selecting a substrate wherein said at least a portion has a density in the range of about 75% to about 99% of full density of said portion.

10. A method as recited in claim 1 wherein selecting a substrate comprises selecting a substrate wherein the substrate prior to sintering has a porosity of in the range of about 1% to about 30%.

11. A method as recited in claim 1 further comprising forming a non-uniform face on the substrate material, wherein the ultra hard material is placed over the non-uniform face.

12. A method as recited in claim 1 wherein the density is selected to minimize the constraint provided by the substrate to the ultra hard material shrinkage during sintering.

13. A method as recited in claim 1 wherein the substrate shrinks during sintering and wherein the density is selected to minimize shrinkage difference between the substrate and the ultra hard material during sintering.

14. A method as recited in claim 1 wherein the ultra hard material comprises diamond.

15. A method as recited in claim 1 wherein selecting a substrate comprises selecting a substrate which substrate has been subjected to a thermal condition for producing said substrate to have at least a portion of the substrate have a density that is less than 100%.

16. A method is recited in claim 1 wherein selecting an ultra hard material comprises selecting an ultra hard porous solid material.

17. A method of manufacturing a cutting element comprising:
selecting an ultra hard diamond material which is not fully densified;
selecting a substrate which has been exposed to a thermal condition for producing partial densification, whereby said substrate has a first portion that has a first density less than 100% of full density due to said exposure, and a second portion that has a second density that is different from the first density;
placing the ultra hard material over the substrate; and
processing the resulting assembly of substrate and ultra hard material at a sufficient temperature and pressure for full densification and metallurgical joining of the substrate and ultra hard material, wherein the ultra hard material shrinks during sintering, and wherein selecting a substrate further comprises selecting the densities of the two portions for providing a desired level of constraint by the substrate to the ultra hard material shrinkage during sintering.

18. A method as recited in claim 17 wherein the first density is in the range of about 70% to about 90% of full density.

19. A method as recited in claim 17 wherein the first density is in the range of about 40% to about 99% of full density.

20. A method as recited in claim 19 wherein the first density is in the range of about 75% to about 99% of full density.

21. A method as recited in claim 17 wherein the first density is in the range of about 40% to about 70% of full density.

22. A method as recited in claim 17 wherein the substrate prior to sintering has a porosity of in the range of about 1% to about 30%.

23. A method as recited in claim 17 further comprising forming a non-uniform face on the substrate material, wherein the ultra hard material is placed over the non-uniform face.

24. A method as recited in claim 17 wherein the second density is 100% of full density.

25. A method as recited in claim 17 wherein first and second densities are also selected for controlling the magnitude of the residual stresses generated on the ultra hard material layer during sintering.

26. A method as recited in claim 17 wherein the densities are selected to minimize the constraint provided by the substrate to the ultra hard material during sintering.

27. A method as recited in claim 17 wherein the substrate shrinks during sintering and wherein the densities are selected to minimize shrinkage difference between the substrate and the ultra hard material during sintering.

28. A method as recited in claim 17 wherein the ultra hard material comprises diamond.

29. A method as recited in claim 17 wherein the substrate has a volume and wherein the ultra hard material layer has a volume and wherein the densities of the two portions are selected in response to the volume of said substrate and the volume of said ultra hard material layer.

30. A method is recited in claim 17 wherein selecting an ultra hard diamond material comprises selecting an ultra hard diamond porous solid material.

31. A method of manufacturing a cutting element comprising:
selecting an ultra hard material having a volume and which is not fully densified;
selecting a substrate having a volume, a first portion that has a first density less than 100% of full density, and a second portion that has a second density that is different from the first density;
placing the ultra hard material over the substrate; and
processing the resulting assembly of substrate and ultra hard material at a sufficient temperature and pressure for full densification and metallurgical joining of the substrate and ultra hard material, wherein the ultra hard material shrinks during sintering, and wherein selecting a substrate further comprises selecting the densities of the two portions in response to the volume of the substrate and the volume of the ultra hard material for providing a desired level of constraint by the substrate to the ultra hard material shrinkage during sintering.

32. A method is recited in claim 31 wherein selecting an ultra hard material comprises selecting an ultra hard porous solid material.

33. A method of manufacturing a cutting element comprising:
selecting an ultra hard material solid having a volume;

selecting a substrate having a volume, wherein at least a portion of said substrate has a density that is less than 100% of full density of said at least a portion;

placing the ultra hard material solid over the substrate; and sintering the resulting assembly of substrate and ultra-hard material solid at a sufficient temperature and pressure for full densification of the substrate and joining of ultra hard material solid to the substrate, wherein selecting a substrate further comprises selecting the density in response to the volumes of said substrate and said ultra hard material solid for providing a desired level of constraint by the substrate to the ultra hard material solid during sintering.

34. A method is recited in claim 33 wherein selecting an ultra hard material solid comprises selecting an ultra hard porous solid material.

* * * * *